United States Patent
Kumar (10) Patent No.: US 11,663,448 B2
(45) Date of Patent: May 30, 2023

(54) NEURAL NETWORK SYSTEMS AND METHODS FOR EVENT PARAMETER DETERMINATION

(71) Applicant: CONDUENT BUSINESS SERVICES, LLC, Florham Park, NJ (US)

(72) Inventor: Niraj Kumar, Karnataka (IN)

(73) Assignee: Conduent Business Services, LLC, Florham Park, NJ (US)

( * ) Notice: Subject to any disclaimer, the term of this patent is extended or adjusted under 35 U.S.C. 154(b) by 905 days.

(21) Appl. No.: 16/456,807

(22) Filed: Jun. 28, 2019

(65) Prior Publication Data

US 2020/0410321 A1 Dec. 31, 2020

(51) Int. Cl.
*G06N 3/049* (2023.01)
*G06N 3/044* (2023.01)

(52) U.S. Cl.
CPC ............ *G06N 3/049* (2013.01); *G06N 3/044* (2023.01)

(58) Field of Classification Search
CPC .... G06N 3/049; G06N 3/0445; G06N 3/0454; G06N 3/04; G06N 3/08
See application file for complete search history.

(56) References Cited

U.S. PATENT DOCUMENTS

| | | |
|---|---|---|
| 8,924,332 B2 | 12/2014 | Maciejewski et al. |
| 8,949,164 B1 | 2/2015 | Mohler |
| 9,715,668 B1 | 7/2017 | Brandt et al. |
| 9,805,311 B1 | 10/2017 | Mohler |
| 9,978,017 B1 | 5/2018 | Simms |
| 10,001,385 B2 | 6/2018 | Park |
| 10,048,918 B2 | 8/2018 | Oyenan et al. |
| 10,176,388 B1 | 1/2019 | Ghafarianzadeh et al. |
| 10,192,327 B1 | 1/2019 | Toderici et al. |
| 10,198,671 B1 | 2/2019 | Yang et al. |
| 10,210,391 B1 | 2/2019 | Jones et al. |

(Continued)

FOREIGN PATENT DOCUMENTS

| | | | |
|---|---|---|---|
| CN | 108984785 A | * | 12/2018 |
| CN | 111327441 A | * | 6/2020 |

OTHER PUBLICATIONS

Xu et al. "Real-Time Event Detection and Feature Extraction using PMU Measurement Data", IEEE SmartGridComm, 2015, pp. 265-270.*

(Continued)

*Primary Examiner* — Li Wu Chang
(74) *Attorney, Agent, or Firm* — Jones Robb, PLLC (57) ABSTRACT

Systems, methods, and computer program products are provided for determining an event parameter are provided. Event data can be matched to a grid comprising gridlines and cells defined by the gridlines. The grid can be mapped to a predetermined area. Each cell can comprise a number of events per predetermined time interval. The cells can be sorted into classes based on the number of events occurring during the predetermined time interval to produce a classified data set. Features can be extracted from the classified data set. The extracted features can be processed using a classifier to determine the event parameter for a future time interval in at least one cell of the cells, for example, crime events. The classifier can comprise a neural network. Systems can comprise one or more of a processor, a neural network, and a user interface.

5 Claims, 5 Drawing Sheets

(56) References Cited

U.S. PATENT DOCUMENTS

| | | | | |
|---|---|---|---|---|
| 10,902,065 | B1* | 1/2021 | Merritt | G06F 3/0482 |
| 2006/0111993 | A1* | 5/2006 | Lawrence | G06Q 40/00 |
| | | | | 705/35 |
| 2010/0082301 | A1* | 4/2010 | Skibiski | H04L 41/12 |
| | | | | 702/188 |
| 2019/0286793 | A1* | 9/2019 | Patton | G06F 16/29 |

OTHER PUBLICATIONS

Rigatos et al. "Neural network-based approach for early detection of cascading events in electric power systems", IET GTD, 2008, pp. 650-665.*

Kianmehr, K. & Alhajj, R. "Effectiveness of Support Vector Machine from Crime Hot-Spots Prediction," Applied Artificial Intelligence: An International Journal http://www.tandfonline.com/loi/uaai20 22.5:433-458 (2008).

Nakaya, T. & Yano, K., "Visualizing Crime Clusters in a Space-Time Cube: An Exploratory Data-Analysis Approach Using Space-Time Kernel Density Estimation and Scan Statistics," Transactions in GIS 14:3:223.239 (2010).

Perry, W. L. et al., "Predictive Policing: The Role of Crime Forecasting in Law Enforcement Operations," Rand Safety and Justice Program ISBN:978-0-8330-8148-3 pp. 1-189 (2013).

Stalidis, P. et al., "Examining Deep Learning Architectures for Crime Classification and Prediction," arXiv preprint arXiv:1812.00602 (2018).

Wang, B. et al., "Deep Learning for Real-Time Crime Forecasting and Its Ternarization," arXiv preprint arXiv:1711.08833 (2017).

Yu, J. et al., "Crime Forecasting Using Data Mining Techniques" 2011 IEEE 11th International Conf. on Data Mining Workshops IEEE, (2011).

Zheng, Y. et al., "Time Series Classification Using Multi-Channels Deep Convolutional Neural Networks," International Conf. on Web-Age Information Management, Springer, Cham, CH., pp. 298-310 (2014).

Zheng, J. et al., "Electric Load Forecasting in Smart Grid Using Long-Short-Term-Memory Based Recurrent Neural Network," 51st Annual Conference on Information Sciences and Systems (CISS) IEEE pp. 1-6 (2017).

* cited by examiner

- 210 — MATCHING EVENT DATA, THE EVENT DATA COMPRISING EVENT LOCATION DATA AND EVENT TIME DATA, TO A GRID COMPRISING GRIDLINES AND CELLS DEFINED BY THE GRIDLINES, WHEREIN THE GRID IS MAPPED TO A PREDETERMINED AREA, AND EACH CELL COMPRISES A NUMBER OF EVENTS PER PREDETERMINED TIME INTERVAL

- 220 — SORTING THE CELLS INTO CLASSES BASED ON THE NUMBER OF EVENTS OCCURRING DURING THE PREDETERMINED TIME INTERVAL TO PRODUCE A CLASSIFIED DATA SET

- 230 — EXTRACTING FEATURES FROM THE CLASSIFIED DATA SET

- 240 — PROCESSING THE EXTRACTED FEATURES USING A CLASSIFIER TO DETERMINE THE EVENT PARAMETER FOR A FUTURE TIME INTERVAL IN AT LEAST ONE CELL OF THE CELLS

NEURAL NETWORK SYSTEMS AND METHODS FOR EVENT PARAMETER DETERMINATION

TECHNICAL BACKGROUND

The main aim of most grid-based hot-spot prediction systems is to divide an area into multiple cells. Such divisions have played an effective role in predictive policing for crime control. Some approaches have related the cell size with crime-controlling resources and crime density. A significant shortcoming of these traditional approaches is that cell size can vary and depends upon a myriad of internal and external facts. Impact of size and the nature of the surrounding crime area (spatial impact) present problems for a grid-based system. If a cell falls in a crime-prone area, then certain features can highly affect and increase the chances of crime in that cell, for example, the actual spread of crime area, crime density, and the like.

There has been a general failure to capture the influence of remote points that might trigger crime in a particular cell. Another problem with grid-based systems is how much nearest neighbor crime can trigger crime in a particular cell. Traditionally, the presence of the crime counts in nearby cells that do not satisfy hot-spot criteria have been ignored due in part to threshold constraints. That is, nearby cells that contain significant crime counts but at a level lower than that defined for a hotspot are not considered. A further issue with grid-based systems is spatial impact triggered by temporal factors. The crime area might increase or decrease due to a temporal and/or weather effect. A combined spatial and temporal effect plays a significant role in the correct prediction of the occurrence of crime in any particular cell at any given time. Existing techniques fail to capture these features. The problem of crime volume prediction has not been previously explored.

OVERVIEW

In accordance with present disclosure, a method of determining an event parameter is provided. The method can comprise one or more of the following steps. Event data comprising event location data and event time data can be matched to a grid comprising gridlines and cells defined by the gridlines. The grid can be mapped to a predetermined area. Each cell can comprise a number of events per predetermined time interval. The cells can be sorted into classes based on the number of events occurring during the predetermined time interval to produce a classified data set. Features can be extracted from the classified data set. The extracted features can be processed using a classifier to determine the event parameter for a future time interval in at least one cell of the cells, for example, the amount and/or type of crime occurring during that future time interval.

In accordance with the present disclosure, a neural network system is provided. The system can comprise one or more of a processor, a neural network, and a user interface. The processor can be configured, for example, to perform one or more of the following steps. Event data comprising event location data and event time data can be matched to a grid comprising gridlines and cells defined by the gridlines. The grid can be mapped to a predetermined area, and each cell can comprise a number of events per predetermined time interval. The cells can be sorted into classes based on the number of events occurring during the predetermined time interval to produce a classified data set. The classes can be divided into relevant segments, for example, percentiles or weighted percentiles. The features can be extracted from the classified data set. The neural network can be configured to determine an event parameter for a future time interval in at least one cell of the cells, for example, the amount and/or type of crime occurring during that future time interval. The user interface can be configured to enable a user to operate the neural network and the processor. The user interface can be further configured to display the event parameter on a map comprising the grid and the cell.

In accordance with the present disclosure, a computer program product for use with a computer is provided. The computer program product can comprise a non-transitory computer readable medium. The non-transitory computer readable medium can store a computer program code. The computer program code can be executable by one or more processors to perform, for example, the following steps. Event data comprising event location data and event time data can be matched to a grid comprising gridlines and cells defined by the gridlines. The grid can be mapped to a predetermined area, and each cell can comprise a number of events per predetermined time interval. The cells can be sorted into classes based on the number of events occurring during the predetermined time interval to produce a classified data set. Features can be extracted from the classified data set. The extracted features can be processed using a classifier to determine an event parameter for a future time interval in at least one cell of the cells, for example, the amount and/or type of crime occurring during that future time interval.

DETAILED DESCRIPTION

The present disclosure provides systems, methods, and computer programs that enable the determination of event parameters, for example, the prediction of where and when crime events are likely to occur. A crime volume prediction system is provided that can predict the spread of crime in the form of different sized volume segments, that is, for example, lower to higher volume buckets. Different from the binary classification of crime areas based on a crime count threshold (hot spot), the system of the present application contains more depth information about the spread of crime. The system and method are not limited to use with crime prediction, and can be used in other applications, for example, epidemiology, internet traffic, vehicular traffic, and utility consumption.

The methods and systems of the present disclosure can employ a grid-based system. There have been a lot of issues and challenges with existing grid-based systems. For example, the cell size of the grid, the nature and/or density of crime can vary between localities. Another challenging issue has been how to effectively predict crime statistics having multiple volume buckets. To address these issues, the present disclosure introduces the use of an automated grid-to-crime volume mapping system, a clustering based spatial-temporal feature extraction system, and an effective convolutional-long short-term memory based-classifier for effective crime volume prediction.

A convolutional LSTM neural network can be employed in accordance with the present disclosure. A type of LSTM related to the CNN-LSTM is the convolutional LSTM (ConvLSTM), where the convolutional reading of input is built directly into each LSTM unit. Methods and system of the present disclosure can use, for example, a convolutional long-short term memory (ConvLSTM) neural network to predict local crime volume from historic data. The volume of crime can be defined as the discretized interval of the crime count in a certain area. The prediction task can be approached as a multi-class classification task with five types of features integrated by a ConvLSTM model. The experimental results described herein show that the ConvLSTM model used in accordance with the present disclosure perform significantly better than a traditional CNN-LSTM model in this task.

A benefit of the methods and systems of the present disclosure is that information is not lost with crime volume. The more fine-grained binned information is more informative for further analysis such as the spread of crime and performs better than a regression analysis. Crime volume prediction based on discretizing intervals and formulating the problem as a multiclass classification was not previously known or contemplated as presented herein.

Accordingly, a method of determining an event parameter is provided. The method can comprise one or more of the following steps. Event data comprising event location data and event time data can be matched to a grid comprising gridlines and cells defined by the gridlines. The grid can be mapped to a predetermined area, and each cell comprise a number of events per predetermined time interval. The time interval can be of any desired duration or repetition thereof, for example, a second, a minute, a hour, a day, a week, a fortnight, a month, a quarter of a year, six month, a year, two years, three years, five years, ten years, a shorter interval, or a longer interval, or an interval of any intermediate duration thereof. The repetition of intervals can be twice, three-times, four-times, five-times, ten-times, twenty-five-times, fifty-times, 100-times, 250-times, 500-times, 1,000-times, or greater, or any intermediate repetition thereof. The cells can be sorted into classes based on the number of events occurring during the predetermined time interval to produce a classified data set. Features can be extracted from the classified data set. Any desired number and/or type of feature can be extracted. For example, at least one feature can be extracted, at least two, at least three, at least four, at least five, at least, at least six, at least seven, at least eight, at least nine, at least ten, at least eleven, at least twelve, at least thirteen, at least fourteen, at least fifteen, at least twenty, at least twenty-five, at least fifty, at least one hundred features, or more features, or any intervening number of features thereof. The extracted features can be processed using a classifier to determine the event parameter for a future time interval in at least one cell of the cells, at least two, at least three, at least five, at 10, at least 25, at least 50, at least 75, at least 100, at least 150, at least 250, at least 500, at least 1,000, or at least 10,000 of the cells, or any intervening number of cells. The classifier can comprise one or more suitable neural networks, for example, a ConvLSTM network, which is distinguishable from a CNN LSTM network.

The classes can be defined and divided using any relevant or suitable partition, for example, as percentiles or weighted percentiles. The features can comprise, for example, a temporal feature, a spatial feature, or a spread feature, or any combination thereof. The extracting can comprise, for example, use of density-based spatial clustering of applications with noise (DBSCAN). The extracting can comprise generating clusters. Each of such clusters can comprise one or more cells, one or more portions of cells, or any combination thereof. The features can comprise, for example, an event history feature, an event spread feature, an event frequency feature, or an average number of events feature, or any combination thereof. The features can comprise, for example, an annual event history, an event spread of an annual quarter, an event frequency of an annual quarter, or an event average of an annual quarter, or any combination thereof. The features can comprise four annual quarterly features per annual quarter feature type, or any other appropriate or desired number of quarter or other features.

The processing can comprise determining the event parameter for a plurality of cells comprising the cell. The method can further comprise displaying the event parameter on a map comprising the grid and the plurality of cells. The event parameter can comprise, for example, an event number, an event frequency, or an event type, or any combination thereof. The classifier can comprise a neural network. The classifier can comprise, for example, a convolutional long short-term memory (Conv-LSTM) neural network. The event can comprise, for example, a crime event. The event can comprise, for example, a sales event, a taxable event, an epidemiological event, a meteorological event, a vehicular traffic event, an internet traffic event, or a utility consumption event, a political event, or any combination thereof. One or more of such events can be combined with the crime event.

A crime event can comprise any type and/or degree of crime. For example, a crime can comprise a misdemeanor, a shoplifting, a moving violation, a parking violation, property damage, vandalism, trespassing, a bomb threat, a larceny, a grand larceny, a felony, a theft, a robbery, an assault, a battery, prostitution, a rape, child abuse, mayhem, a murder, narcotics possession, narcotics trafficking, human trafficking, smuggling, a local crime, a state crime, or a federal crime, or any combination thereof. The crime event can be criminal in nature, tortious in nature, or terrorism-related, or any combination thereof. A crime or other event can be logged with respect to one or more attribute of the perpetrator, for example, gender, age, race, height, weight, physical feature, income, residence, nationality, immigration status, religion, gang affiliation, repeat offender, income, or occupation, or any combination thereof. The perpetrator can be tagged as a perpetrator of a previous crime that is the same, similar, or different from the recorded crime.

A sales event can comprise, for example, the number and/or type of products sold and/or purchased. Optionally the corresponding price can be included, whether or not a discount ("sale" or "sales event") was in effect, or any other relevant factor. A taxable event can comprise, for example, a sales tax, a real estate tax, an income tax, a tariff, a valued added tax, or a personal property tax, or any combination thereof. An epidemiological event can comprise a communicable disease, a hereditary disease, a cancer, a sexually transmitted disease, an influenza, a virally transmitted disease, a bacterially transmitted disease, a protozoa-transmitted disease, a physical injury, or a psychological trauma, or any combination thereof. A meteorological event can comprise, for example, precipitation, rain, snow, hail, fog, ice, wind, temperature, temperature inversion, atmospheric pressure, storm, thunder, lightning, a tornado, a hurricane, a cyclone, a weather front, a climatic fluctuation, smog, particulate concentration, sand storm, pollution, or solar storm, or any combination thereof.

A vehicular traffic event can comprise, for example, traffic volume, a traffic jam, a traffic delay, an accident, speed limit change, traffic speed, police activity, fire department activity, an ambulance event, a paramedic event, a road construction, a road closure, a detour, road conditions, ice, snow, flooding, a sporting event (marathon, car race, bicycle race, or the like), livestock blockage, a pothole, downed tree, an overhead utility line down, a bridge collapse, a sign installation, a signal (traffic light) malfunction, paving, or line painting, or any combination thereof. An internet traffic event can comprise, for example, bandwidth usage, bandwidth availability, number of users, average traffic speed, download speed, upload speed, outage, intermittent outage, prolonged outage, type of content, or amount of content, or any combination thereof. A utility consumption event can comprise, for example, utility consumption, a utility outage, a utility restriction, a number of users, an electrical service event, a natural gas event, a water event, a sewer event, a telephone event, a broadband event, or a steam event, or any combination thereof. A political event can comprise, for example, an election, a primary election, a general election, a ballot casting, a poll, a voter registration event, a voter registration status, a voting record, a party affiliation, a recount, a rally, a fundraiser, a contribution, a nomination, a candidacy, or a protest, or any combination thereof. Events with casual or correlated relationships can be logged together or separately.

The methods of the present disclosure can be performed once or repeated any desired number of times. The methods can be performed in accordance with a predetermined schedule or on ad hoc, as needed basis. A method can be repeated in the same manner or repeated with one or more modifications. The method can be repeated with the same or different data. The methods can comprise collecting data, receiving data from a source, or any combination thereof. Data can be received from a single source or multiple sources. Data can be collected using a uniform methodology or using different methodologies. Data can be collected from police reports, news reports, self-reporting, surveys, surveillance, investigations, or approximation, or any combination thereof.

In accordance with the present disclosure, a neural network system is provided. Elements described with respect to methods of the present disclosure are also applicable to systems of the present disclosure and vice versa. The system can comprise one or more of a processor, a neural network, and a user interface. The processor can be configured, for example, to perform one or more of the following steps. Event data comprising event location data and event time data can be matched to a grid comprising gridlines and cells defined by the gridlines. The grid can be mapped to a predetermined area, and each cell comprises a number of events per predetermined time interval. The predetermined area can be a geographical area or any other area, for example, a near earth area, an orbital area, an extraterrestrial area, an area of an image, an area of an object, an area of a building, or an anatomical area, or any combination thereof. The geographical area can comprise, for example, an arbitrarily defined area, a municipality, a city, a town, a village, a township, a county, a precinct, a constituency, a ZIP code, a state, a country, a nation, a region, a federation, a watershed, a climatic region, a United States Department of Agriculture (U.S.D.A) growing zone, an economic development area, an ethnic region, a religious region, a combat zone, a demilitarized zone, a curfew area, a contaminated area, a coastal area, a terrestrial area, an aquatic area, a marine area, an atmospheric area, or a topographically defined area, or any combination thereof.

The cells can be of any scale (dimension) or combination of scales. For example, can be at least one square nanometer, at least one square millimeter, at least one square centimeter, at least one square inch, at least one square foot, at least one square yard, at least one square meter, at least one square kilometer, at least one square mile, at least five square kilometers, at least five square miles, at least 10 square kilometers, at least 10 square miles, at least 25 square kilometers, at least 25 square miles, at least 50 square kilometers, at least 50 square miles, at least 100 square kilometers, at least 100 square miles, or smaller, or larger, or any intermediate area thereof. The cells can be sorted into classes based on the number of events occurring during the predetermined time interval to produce a classified data set. The classes can be divided into relevant segments, for example, percentiles or weighted percentiles. Examples of percentiles include third percentiles, quarter percentiles, fifth percentiles, and tenth percentiles. The features can be extracted from the classified data set. The neural network can be configured to determine an event parameter for a future time interval in at least one cell of the cells. The user interface can be configured to enable a user to operate the neural network and the processor. The user interface can be further configured to display the event parameter on a map comprising the grid and the cell. The event parameter can be output in a desired medium or combination of media. Further analysis can be performed using the event parameter or a combination of event parameters.

The features can comprise, for example, a temporal feature, a spatial feature, or a spread feature, or any combination thereof. The extracting can comprise use of density-based spatial clustering of applications with noise (DBSCAN). The neural network can comprise, for example, a convolutional long short-term memory (Conv-LSTM) neural network. The event can comprise, for example, a crime event, sales event, a taxable event, an epidemiological event, a meteorological event, a vehicular traffic event, an internet traffic event, a utility consumption event, or a political event, or any combination thereof.

In accordance with the present disclosure, a computer program product for use with a computer is provided. The computer program product can comprise a non-transitory computer readable medium. The non-transitory computer readable medium can store a computer program code. The computer program code can be executable by one or more processors to perform, for example, the following steps and/or any steps, elements, or both of the methods described herein. Event data comprising event location data and event time data can be matched to a grid comprising gridlines and cells defined by the gridlines. The grid can be mapped to a predetermined area. Each cell can comprise a number of events per predetermined time interval, for example, quarterly. The cells can be sorted into classes based on the number of events occurring during the predetermined time interval to produce a classified data set. Features can be extracted from the classified data set. The extracted features can be processed using a classifier to determine an event parameter for a future time interval in at least one cell of the cells.

Figure 1:
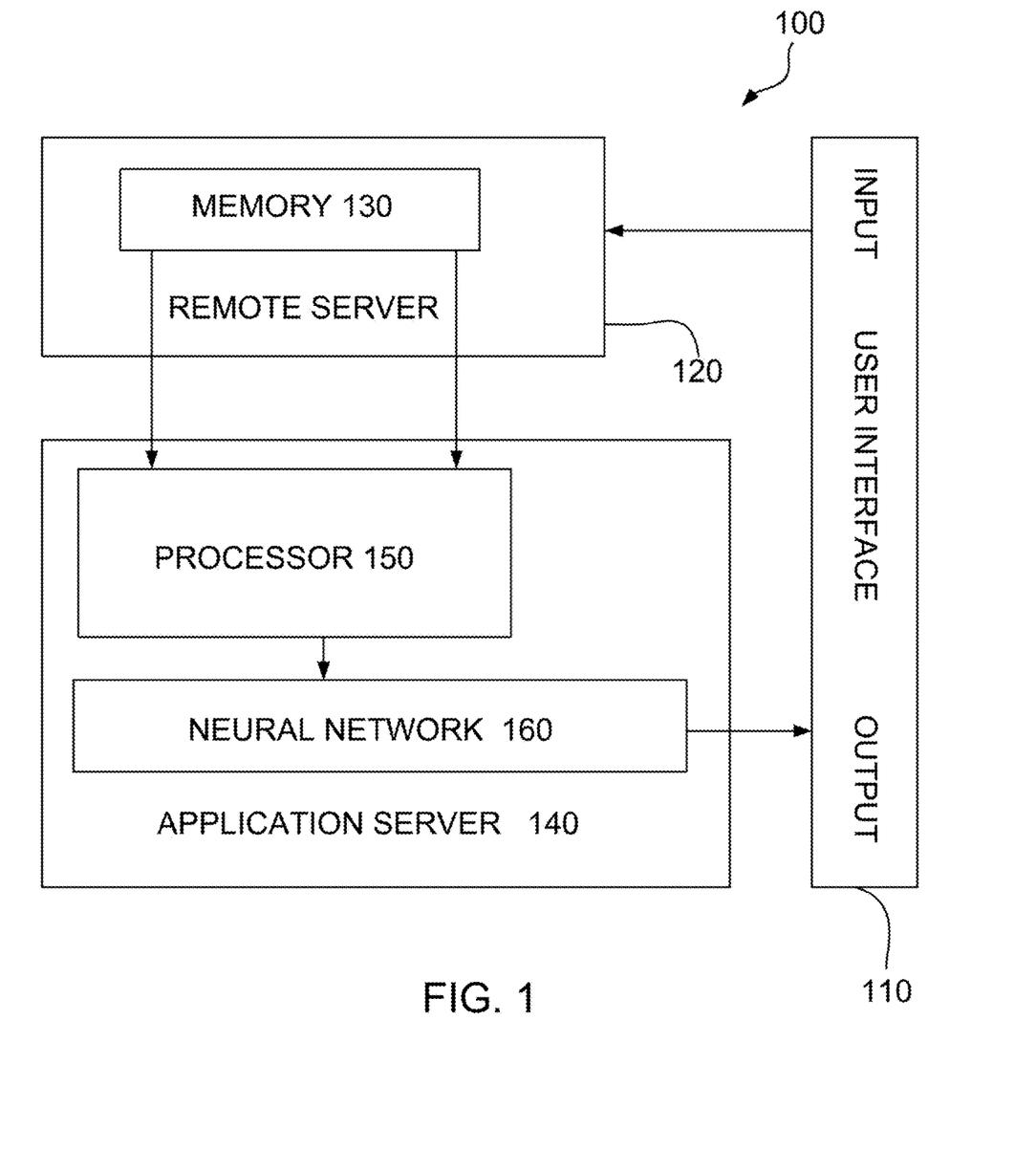
FIG. 1 is a schematic diagram of a neural network system in accordance with the present disclosure.

FIG. 1 is a schematic diagram of a neural network system 100 in accordance with the present disclosure. Neural network system 100 can comprise one or more of a user interface 110, a remote server 120, a memory 130, an application server 140, a processor 150, and a neural network 160. User interface 110 can be configured to input data, control the parameters of neural network system 100, and receive output data. User using user interface 110 can affect transfer of primary data saved on a remote server 120 comprising a memory 130 to an application server 140. Application server 130 can comprise processor 150 and neural network 160. Primary data can be pre-processed by processor 150 before processing by neural network 160. The output of neural network 160 can be transferred to and displayed on user interface 110. Instead of separate servers, realized as remote server 120 and application server 140, a single server, computer, or other device can house and/or perform the functions of memory 130, processor 150, and neural network 160. The output of neural network can be stored in any suitable medium, display on any suitable device, or printed as a hard copy, or any combination thereof.

Figure 2:
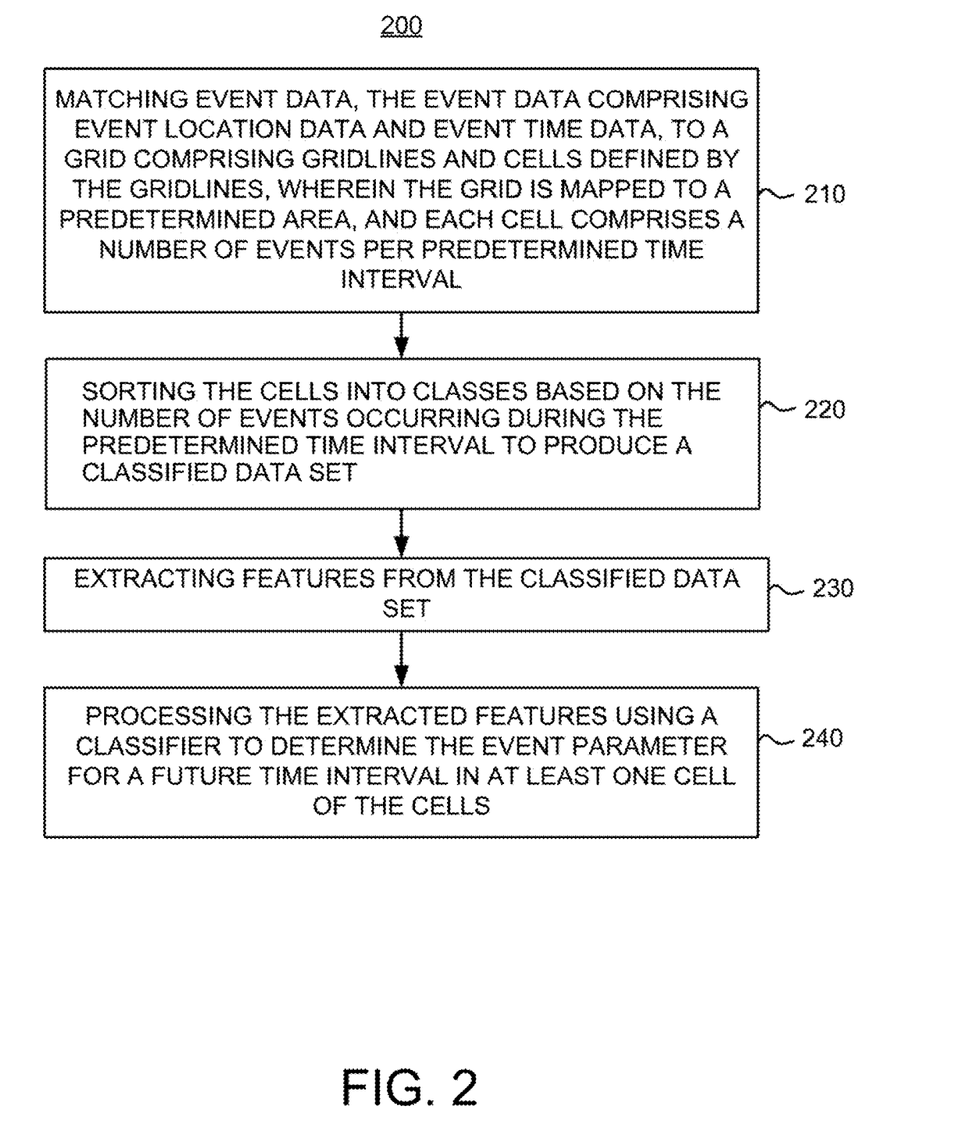
FIG. 2 is a flow diagram of a method of determining an event parameter in accordance with the present invention.

FIG. 2 is a flow diagram of a method 200 of determining an event parameter in accordance with the present invention. The method can comprise one or more of the following steps. Event data comprising event location data and event time data can be matched in a step 210 to a grid comprising gridlines and cells defined by the gridlines, wherein the grid is mapped to a predetermined area, and each cell comprises a number of events per predetermined time interval. The cells can be sorted in a step 220 into classes based on the number of events occurring during the predetermined time interval to produce a classified data set. Features can be extracted from the classified data set in a step 230. The extracted features can be processed using a classifier to determine the event parameter for a future time interval in at least one cell of the cells in a step 240.

Figure 3A:
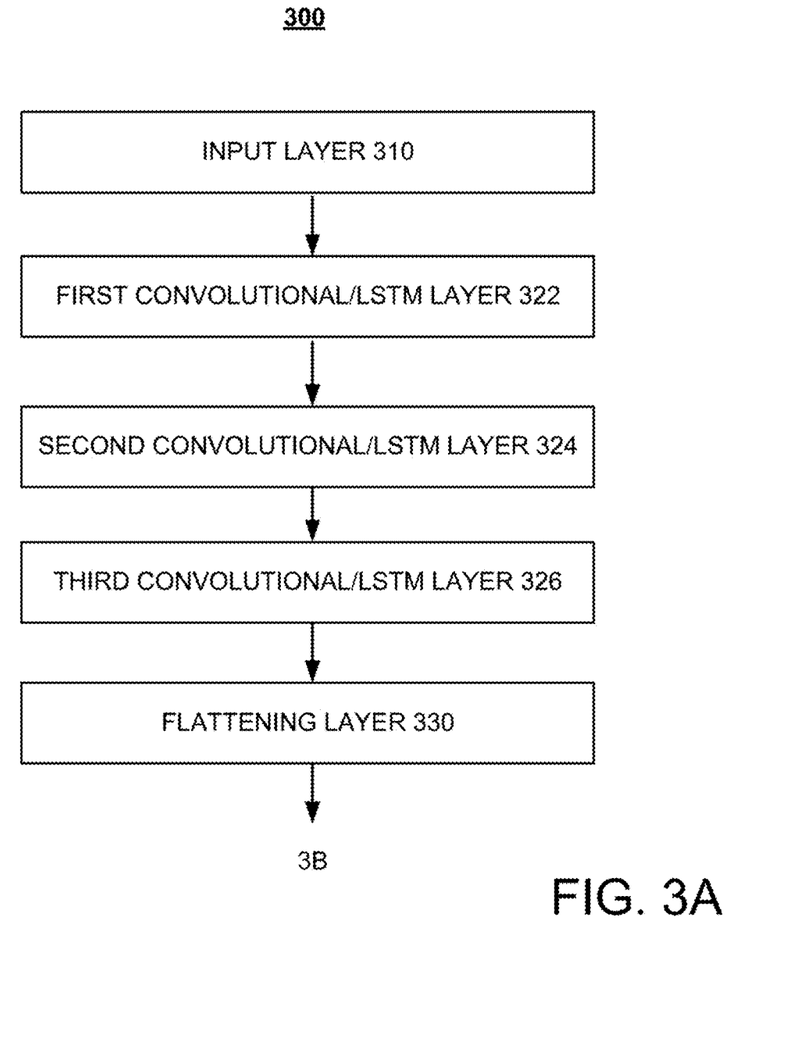
FIGS. 3A and 3B depict a system architecture for a neural network in accordance with the present disclosure.
Figure 3B:
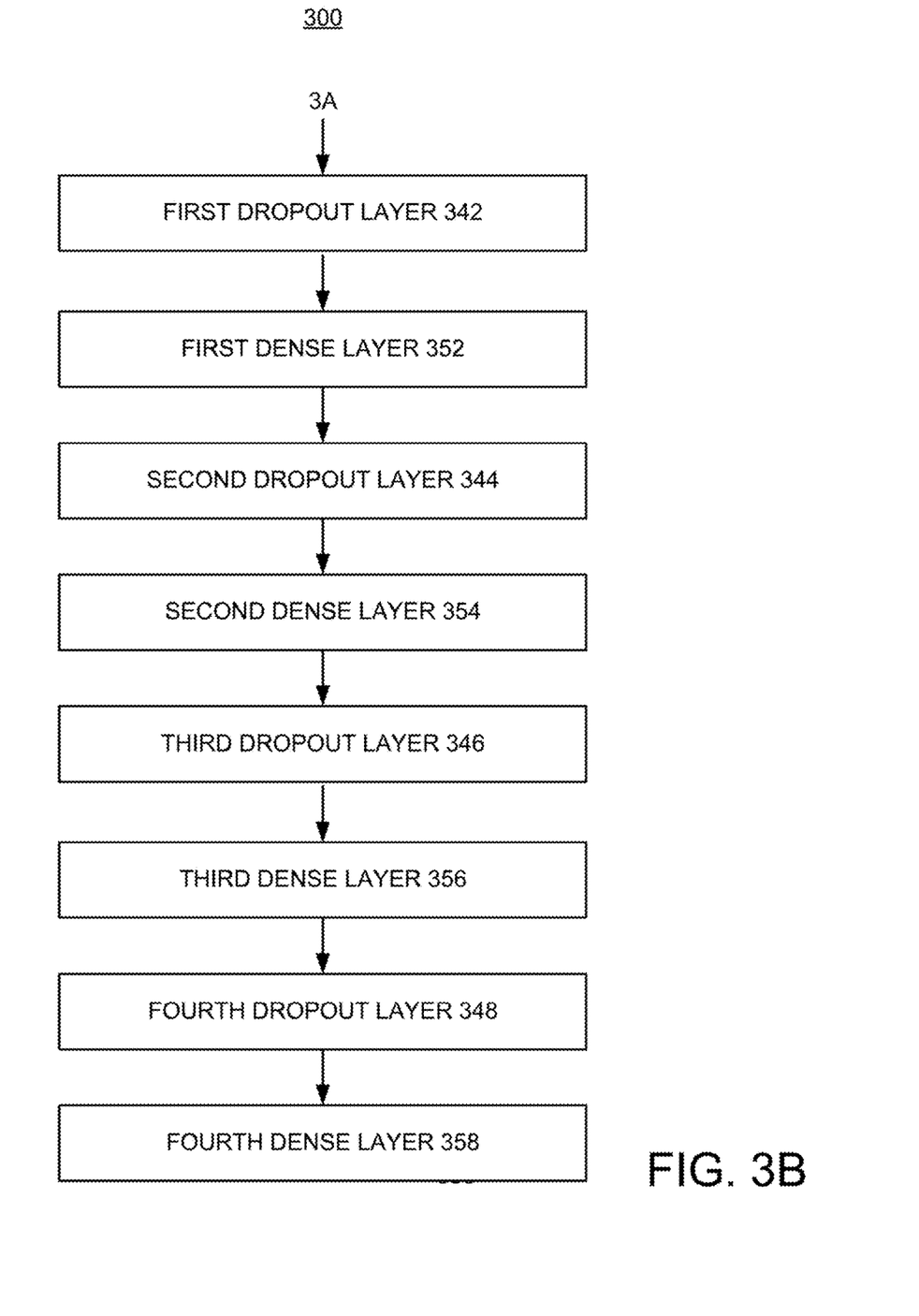

FIG. 3 is a system architecture 300 for a neural network in accordance with the present disclosure, for example, neural network 150 depicted in FIG. 1. Data can be processed through an input layer 310, a first convolutional/LSTM layer 322, a second convolutional/LSTM layer 324, and a third convolutional/LSTM layer 326, and a flattening layer 330. The flattened data then can pass through a series of dropout and dense layers of a deep neural network, including, for example, a first dropout layer 342 and a first dense layer 352, a second dropout layer 344 and a second dense layer 354, a third dropout layer 346 and a third dense layer 356, and a fourth dropout layer 348 and a fourth dense layer 358. However, any desirable number of dropout and dense layers can be employed. One or more max-pooling or other types of layers can also or alternatively be employed.

The first part of the system can comprise automating the mapping between cells and crime volume levels. The second part can comprise identifying spatial and temporal features that affect crimes. The third part can use a Cony-LSTM based system for automatic crime volume prediction. For the first part involving mapping, a weighted percentile can be used, where the percentage of the total weight is counted instead of the total number. A weighted percentile can be calculated using any appropriate technique. For example, one method that can be used extends the above approach in a natural way. Positive weights $w_1, w_2, w_3, \ldots, w_N$ can be associated with respect to the following equation.

$$S_n = \sum_{k=1}^{N} w_k$$

The sum of weights then the formulas above can be generalized by:

$$P_n = \frac{1}{S_N}\left(x_n - \frac{w_n}{2}\right) \text{ and } v = v_k + \frac{P - p_k}{p_{k+1} - p_k}(v_{k+1} - v_k)$$

The weighted percentile score of crime volume of all given cells can be used. Next the score can be divided in the range of ten intervals (percentiles), that is, [0-10], [11-20], [21-30], [31-40], [41-50], [51-60], [61-70], [71-80], [81-90], and [91-100]. Python's Panda package can be used to compute the weighted percentile score of crime volume data. A total of ten buckets represents the crime volume. However, a different number of buckets, for example, twenty, or any other number can be used. Empty buckets can be removed from the calculation. The buckets can be treated as classes and used to represent the crime statistics. The actual crime volume can be converted into a percentile format.

The input for the first part is crime spot (latitude and longitude) and time (month, year). The output for the first part is a grid comprising longitude-latitude mapping (stored with the help of a dictionary). In the second part, spatial and temporal features are extracted. This part can be targeted to capture three different types of features: temporal features, for example, the impact of time on crime, local spatial features, and the impact of the spread of crime. Crime can be divided, for example, on a quarterly basis. Density-based spatial clustering of applications with noise (DBSCAN) can be applied on crime spots separated on quarterly basis. The input can include crime spots (latitude and longitude) and time (for example, month, year), and cell to longitude-latitude mapping. The output can include crime spot clusters with quarter (that is, first quarter, second quarter, third quarter, and fourth quarter), mapping of spread of clusters to grid, size of each of the clusters (that is, the spread of clusters within cells, or number of cells within the cluster), crime spot point density in each of the obtained clusters or number of crime spots in each of the clusters, and count of number of quarters in which any given cell come under a crime spot. The first quarter includes the first three months, the second quarter includes the fourth, fifth, and sixth months, the third quarter includes the next three months, and the fourth quarter includes the final three months of the year. Quarters can also be defined out of sync from a standard calendar year or otherwise defined.

The clusters can be formed by using longitude and latitude points. A cluster can be spread into multiple cells or lie inside of one cell. To map how many cells are covered by any of the given clusters, longitudes, latitudes from that cluster can be considered and checked using the mapping grid. Even if a single longitude-latitude point (related to the given cluster) lies inside any of the given cell, the point can be counted. A cluster can be a group of longitude-latitude points. The area of spread can be the count of adjacent cells, which contains the longitude-latitude points from the given cluster.

Crime spot points (latitude and longitude) can be divided into the four annual quarters. For points in each quarter, crime spot points clusters are extracted using DBSCAN. Parameters that can be used, for example, are: eps=0.3, min_sample=5, and leaf_size=25. The parameter "eps" (float, optional) indicates the maximum distance between two samples for them to be considered as in the same neighborhood. The eps is the minimum distance between two points. It means that if the distance between two points is lower or equal to this value (eps), these points are considered neighbors. The parameter "minPoints" is the minimum number of points to form a dense region. For example, if the minPoints parameter is set as 5, then at least 5 points are used to form a dense region. The distance between crime spots (represented as longitude-latitude) can be used to calculate both parameters eps and minPoints. Based on the outcome of the DBSCAN clustering, it can be decided which crime-spot will go in which cluster. Examples of further parameters that can be used include the following. The parameter "min_samples" (int, optional) indicates the number of samples (or total weight) in a neighborhood for a point to be considered as a core point, including the point itself. The parameter "leaf_size" (int, optional; default=30) indicates leaf size passed to BallTree or cKDTree. This parameter can affect the speed of the construction and query, as well as the memory to store the tree. The optimal value can depend on the nature of the problem. Each of the identified clusters can mapped to existing cells. The features discussed in the "output" can be extracted.

In the features extracted for each cell, a total 'n'=14, for example, features named as Feature-i{1≤i≤n} can be extracted. The first feature "Feature-1" can be the crime history for the entire year. The main aim of this feature is to check, whether, crime happens the entire year or if it is specific to some quarters. For this feature, the number quarters the given cell comes under crime-spot clusters can be checked. A value of zero can be assigned, if it does not come into any cluster at any quarter (for all the previous years). A value of 1 can be assigned if it comes in the crime spot cluster in one quarter for at least one-year data. Similarly, values, of 2, 3, and 4 can be assigned.

The second feature "Feature-2" can be the spread of crime-spot clusters per quarter. The main aim is to identify the spread of crime area, in which the given cell lies. The high spread of a crime area means, that an area is a crime affected area. If any cell lies in that area, then the chances of crime can be predicted to increase. To include the weather-related feature, data based on quarters can be collected. Thus, this feature can have four options. For first quarter crime spread, for example, the month information related to the given cell belongs to the first quarter, it can be checked whether that cell comes under any crime-spot cluster or not. If it does, then, the maximum spread of that cluster in cells can be identified. The average count of cells that lies inside clusters can be used (for example, if it contains multiple clusters due to crimes-spread at previous years). The third feature "Feature-3" can be the second quarter crime spread. Similar to the approach for the second feature, the cell count can be collected by using the average spread of crime-spot clusters. Similarly, "Feature-4" can correspond to the third quarter crime spread and "Feature-5" can corresponds to the fourth quarter crime spread.

Figure 4A:
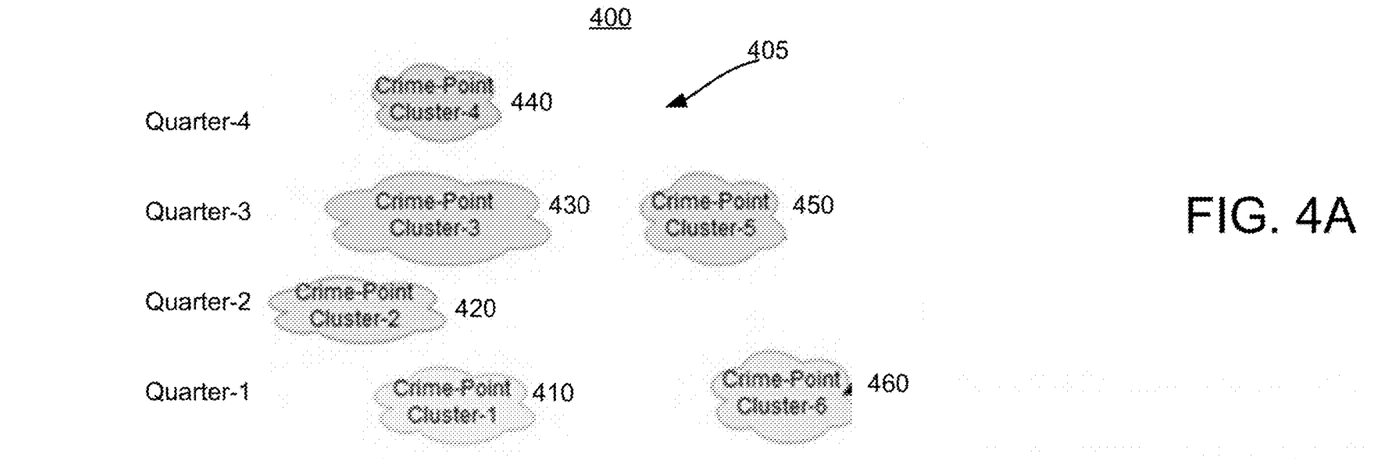
FIGS. 4A and 4B are illustrations of using clustering to capture different features in accordance with the present disclosure.
Figure 4B:
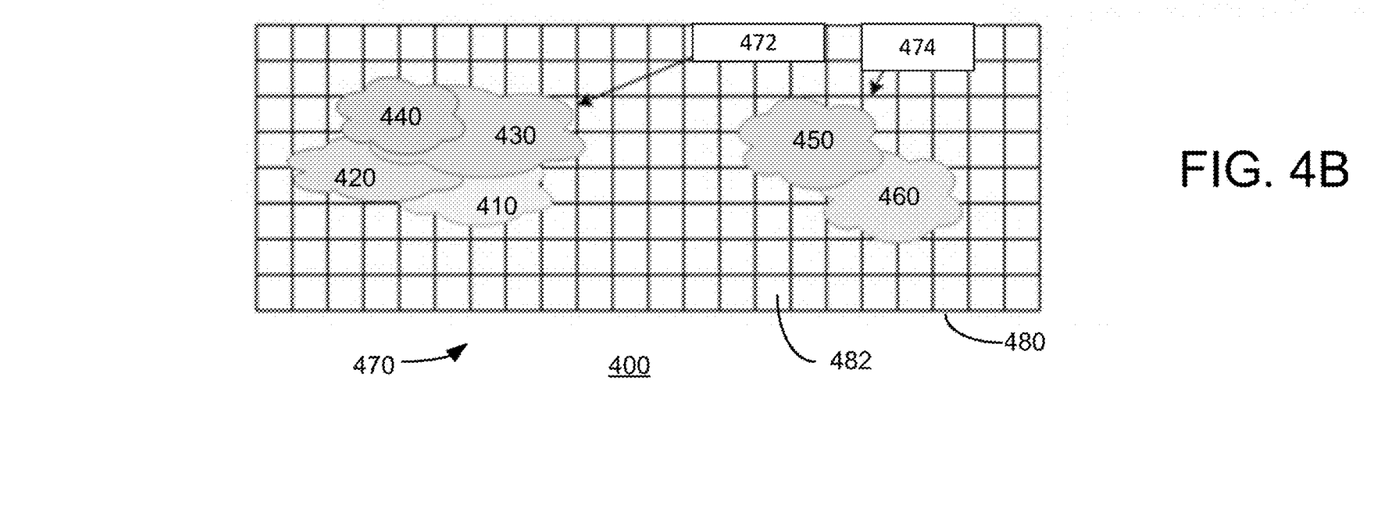

FIGS. 4A and 4B illustrate an example 400 of clustering to capture different features in accordance with the present disclosure. FIG. 4A shows crime spot clusters 405 obtained using the longitude and latitude coordinates of crime spots over the course of a year divided into four quarters, that is, three months each. Clusters are determined using any appropriate method, for example, using a method in accordance with the present disclosure. These clusters include Crime-Point Cluster-1, indicated by 410 (Quarter-1), Crime-Point Cluster-2, indicated by 420 (Quarter-2), Crime-Point Cluster-3 indicated by 430 (Quarter-3), Crime-Point Cluster-4 indicated by 440 (Quarter-4), Crime-Point Cluster-5 indicated by 450 (Quarter-3), and Crime-Point Cluster-6 indicated by 460 (Quarter-1). Example 400 demonstrates that there can be more than one cluster in a given time period such as an annual quarter. In FIG. 4B, Clusters 405 are represented in a map 470 as two groups 472, 474 mapped to a grid 480, the grid comprising a plurality of cells, for example, cell 482. Example 400 also demonstrates that clusters can overlap and overlapping clusters can represent a group.

In the second part, the input can comprise (1) crime spots (latitude and longitude) with time (month, year), and (2) grid to longitude-latitude mapping. Thus, the output of first part can be used as one of the inputs for the second part. In the second part, the output can comprise: (1) crime-spot clusters with quarter (that is, first, second, third, and fourth quarters), (2) mapping of spread of clusters to grid, (3) size of each of the clusters (that is, spread of cluster in cells, or number of cells that fall in the cluster), (4) crime spot point density in each of the obtained clusters or number of crime spots in each of the clusters, and (5) count of number of quarters in which any given cell falls under a crime spot. The output of the second part can be used to create final set of features for the third part. Spread of crime-spot clusters per quarter (i.e., Feature-2, Feature-3, Feature-4 and Feature-5 can be extracted with the help of Output of Stage-2).

The frequency of crime in quarters has the main aim to check whether there is any long history of crimes in the given cell area in the particular quarter. For any cell, if the presence of crime is observed for three years, then a count value of three can be used. The crime frequency-based features for the four quarters can be collected. The first quarter crime frequency can be "Feature-6," the second quarter crime frequency can be "Feature-7," the third quarter frequency can be "Feature-8," and the fourth quarter crime frequency can be "Feature-9." The quarterly crime density history can contain the average of quarterly crime count in the given grid. For each quarter, there can be one feature represented as "Feature-10," "Feature-11," "Feature-12," and "Feature-13." Adjacent Nearest Neighbor cells having crime history can be represented as "Feature-14."

Convolutional LSTM can be employed. A type of LSTM related to the CNN-LSTM is the convolutional LSTM (ConvLSTM), where the convolutional reading of input is built directly into each LSTM unit. The ConvLSTM can determine the future state of a certain cell in the grid by the inputs and past states of its local neighbors. This determination can be achieved by using a convolution operator in the state-to-state and input-to-state transitions. Exemplary equations of ConvLSTM are shown below, where ° denotes the convolution operator and '*', as a Hadamard product.

$$i_t = \sigma(W_{xi} * X_t + W_{hi} * H_{t-1} + W_{ci} \circ C_{t-1} + b_i)$$

$$f_t = \sigma(W_{xf} * X_t + W_{hf} * H_{t-1} + W_{cf} \circ C_{t-1} + b_f)$$

$$C_t = f_t \circ C_{t-1} + i_t \circ \tanh(W_{xc} * X_t + W_{hc} * H_{t-1} + b_c)$$

$$o_t = \sigma(W_{xo} * X_t + W_{ho} * H_{t-1} + W_{co} \circ C_{t-1} + b_o)$$

$$H_t = o_t \circ \tanh(C_t)$$

Next, all inputs can be represented as $X_1, X_2, X_3, \ldots, X_t$, cell outputs can be represented by $C_1, C_2, C_3, \ldots, C_t$ and hidden states can be represented by $H_1, H_2, H_3, \ldots, H_t$. The gates $i_t, f_t, o_t$ of the ConvLSTM, i.e., can be 3D tensors, whose last two dimensions can be spatial dimensions (rows and columns). In LSTM, the output of the previous LSTM-node can be fed into the current LSTM-node.

The system and methods of the present disclosure can automate the fitting of crime volume to the grid of different sizes, capture spatial and temporal information more effectively in the grid setup, and can use ConvLSTM for crime volume prediction. Other data and analysis that can be used include psychometric behavior analysis or psychometric profiling of people (based on their social behavior and social media activities) and local demographics for crime volume prediction. A multi-level crime volume prediction system can be used, where, levels can represent the class of crimes.

The input and output (see Table-1), can be used to generate a crime prediction report, chart, table, or map for the given area. The system can generate raw output that can be feed to any suitable media, for example, on a monitor screen or as a hard copy print out. The output can be interactive.

EXAMPLE

For the experimental evaluation, a felony dataset from a major metropolitan area was used comprising data for the years 2010 through 2015 that included 653,447 incidents. Each incident had the properties of coordinates, offense type, and time. 8,000 incidents without borough information and 8 incidents with abnormal coordinates were removed. The remaining 645,439 incidents were used in the experiment. This data was divided into a grid of 250 meter-square, 500 meter-square, and 1 kilometer-square cells. To maintain the effectiveness of the learned crime volume prediction model, a testing period in the future was defined in which the model is assumed to be valid. Assuming the training data is built based on the crime data before time t, the testing data was built using the same method based on the crime data within [t, t+Δ], where Δ defines the testing period (for example, one day, one week, or one month). The testing period chose for the experiment was one month. The crime prediction model is considered trained based on data before time t to be valid only during [t, t+Δ], and retrain a new model at t+Δ for the next testing period. Therefore, Δ defines the update frequency of the crime prediction model. Based on this discussion, the training and test data is defined as follows:

$t=${ranges from 2011 to 2013} and $t+\Delta=${felony data from 2014}       Case-1:

$t=${ranges from 2011 to 2014} and $t+\Delta=${felony data from 2015}       Case-2:

Both cases are used in the evaluation process. Three controls (models 1, 2, and 3) for comparative evaluation of the experimental system (model 4). Model-1 contains a 2-stage Multi Channel Deep Convolutional Neural Network (MC-DCNN) architecture. Time series classification using multi-channels deep convolutional neural networks was used. This architecture includes three channels input, two filter layers, two pooling layers, and two fully-connected layers. Model-2 is a CNN-LSTM model. In Model-2, a CNN model can be used in a hybrid model with an LSTM backend where the CNN is used to interpret subsequences of input that together are provided as a sequence to an LSTM model to interpret. Model-3 is a Stacked LSTM model using 3 stacked LSTM layers. The F1 score can be interpreted as a weighted average of the precision and recall, where an F1 score reaches its best value at 1 and worst score at 0. The relative contribution of precision and recall to the F1 score are equal. The formula for the F1 score is: F1=2* (precision*recall)/(precision+recall). Table 1 includes the evaluation results.

TABLE 1

EVALUATION RESULTS

| | | Micro-F1 score on cell sizes | | |
| --- | --- | --- | --- | --- |
| | Model | 250 Sq. Meter | 500 Sq. Meter | 1.0 Sq. km |
| Case-1 | Model-1 | 62.12 | 68.00 | 70.81 |
| | Model-2 | 66.00 | 72.99 | 73.01 |
| | Model-3 | 65.09 | 68.11 | 72.80 |
| | Model-4 | 72.03 | 77.58 | 80.40 |
| Case-2 | Model-1 | 62.30 | 69.02 | 70.00 |
| | Model-2 | 66.50 | 71.80 | 72.91 |
| | Model-3 | 64.09 | 71.00 | 72.03 |
| | Model-4 | 70.01 | 76.64 | 79.80 |

The results given in Table 1 show that the experimental system (Model-4) performs better than other baseline systems. Results show the effectiveness of the devised system. The experimental evaluations show, on average the system can predict the crime with 79.50+% F-score with cell-size one square KM, 76.50+% F-score with Cell size 500 square meter and 71.00+% on cell size 250 square meters.

The above description and associated figures disclose the best mode of the disclosure. Note that some aspects of the best mode may not fall within the scope of the disclosure as specified by the claims. Those skilled in the art will appreciate that the features described above can be combined in various ways to form multiple variations of the disclosure. As a result, the disclosure is not limited to the specific embodiments described above, but only by the following claims and their equivalents.

What is claimed is:

1. A neural network system, the system comprising:
 a processor configured to:
  match event data, the event data comprising event location data and event time data, to a grid comprising gridlines and cells defined by the gridlines, wherein the grid is mapped to a predetermined area, and each cell comprises a number of events per predetermined time interval,
  sort the cells into classes based on the number of events occurring during the predetermined time interval in each cell to produce a classified data set, wherein the classes are percentiles or weighted percentiles, and
  extracting features from the classified data set;
 a neural network configured to determine an event parameter for a future time interval in at least one cell of the cells; and
 a user interface configured to enable a user to operate the neural network and the processor, and configured to display the event parameter on a map comprising the grid and the cell.

2. The system of claim 1, wherein the features comprise a temporal feature, a spatial feature, or a spread feature, or any combination thereof.

3. The system of claim 1, wherein the extracting comprises use of density-based spatial clustering of applications with noise (DBSCAN).

4. The system of claim 1, wherein the neural network comprises a convolutional long short-term memory (Conv-LSTM) neural network.

5. The system of claim 1, wherein the event comprises a crime event, sales event, a taxable event, an epidemiological event, a meteorological event, a vehicular traffic event, an internet traffic event, a utility consumption event, or a political event, or any combination thereof.

\* \* \* \* \*